(12) United States Patent
Bedi et al.

(10) Patent No.: US 7,967,151 B1
(45) Date of Patent: Jun. 28, 2011

(54) UNIVERSAL FUEL RECYCLING MACHINE

(75) Inventors: Ram D. Bedi, Bloomfield Township, MI (US); George R. Blundy, Walled Lake, MI (US)

(73) Assignee: K.J. Manufacturing Co., Wixom, MI (US)

( * ) Notice: Subject to any disclaimer, the term of this patent is extended or adjusted under 35 U.S.C. 154(b) by 236 days.

(21) Appl. No.: 12/288,192

(22) Filed: Oct. 17, 2008

Related U.S. Application Data

(60) Provisional application No. 60/980,465, filed on Oct. 17, 2007.

(51) Int. Cl.
*B01D 29/56* (2006.01)
(52) U.S. Cl. .................. 210/416.4; 210/259; 210/424
(58) Field of Classification Search .......... 210/252, 210/259, 416.1, 416.4, 424
See application file for complete search history.

(56) References Cited

U.S. PATENT DOCUMENTS

| | | |
|---|---|---|
| 4,081,373 A | 3/1978 | Rozniecki |
| 4,257,890 A | 3/1981 | Hurner |
| 4,469,143 A | 9/1984 | Vazin |
| 4,683,055 A | 7/1987 | Bosch et al. |
| 5,132,009 A | 7/1992 | Futa, Jr. et al. |
| 5,154,775 A | 10/1992 | Bedi |
| 5,526,782 A | 6/1996 | Bedi et al. |
| 5,534,138 A | 7/1996 | Coale |
| 5,547,565 A | 8/1996 | Biere et al. |
| 5,837,132 A | 11/1998 | Hurner |
| 5,900,155 A | 5/1999 | Bedi |
| 6,408,736 B1 | 6/2002 | Holt et al. |
| 6,569,320 B1 | 5/2003 | Bedi et al. |
| 6,868,808 B2 * | 3/2005 | Brunemann et al. ............ 123/3 |
| 6,896,014 B1 | 5/2005 | Bedi |
| 2004/0118764 A1* | 6/2004 | Miller et al. ................. 210/258 |
| 2005/0211636 A1* | 9/2005 | Schien et al. ................ 210/739 |
| 2010/0193415 A1* | 8/2010 | Nagai ........................... 210/91 |

* cited by examiner

*Primary Examiner* — Fred Prince
(74) *Attorney, Agent, or Firm* — Young & Basile

(57) ABSTRACT

A money saving universal fuel recycling machine has a reservoir for receiving fuel from a used fuel filter or other source of used or old fuel. A pumping device selectively moves the fuel from the reservoir through the filtration devices. Each filtration device has a lower portion for collecting water and other waste material for selective removal to a waste receptacle. The filter fuel that can be selectively routed to either a new fuel filter or a recycled fuel container.

18 Claims, 3 Drawing Sheets

UNIVERSAL FUEL RECYCLING MACHINE

BACKGROUND

The present invention is directed to a method and apparatus for recycling fuel from a removable fuel receptacle such as an engine fuel filter.

Engine fuel filters must be routinely changed to insure proper function of the associated engine. These devices tend to hold significant quantities of residual fuel. These filters need to be removed and replaced or replenished periodically to ensure proper engine performance.

Additionally, the removed used fuel filter can contain several ounces of fuel. The fuel in contained in the removed filter is, typically, mixed with water and/or other contaminating materials. If this material is discarded indiscriminately, it can cause environmental degradation. Although the contaminated material can be disposed of in an environmentally friendly manner, with the increasing concerns of energy conservation, it is financially and environmentally prudent to recycle the filter fuel as well as the filter material itself. All too often, significant quantities of the fuel contained in an engine fuel filter remain in the filter, creating disposal problems. It would be advantageous if the spent filter could be drained in an efficient and environmentally safe manner to facilitate reuse of the fuel and recycle or environmentally sound disposal of the filter housing.

It should also be noted that, due to the typical volume of some fuel filters, the newly positioned replacement or replenished filter should be charged with a suitable volume of fuel before resuming normal engine operations in order to achieve maximum engine efficiency and fuel economy can be achieved in the optimum amount of time. Thus, fuel filter changes can also necessitate the additional step of charging the fuel filter with a volume of fuel after the filter is in position on the vehicle.

SUMMARY

A universal fuel recycling assembly is provided having means for establishing fluid communication with a source of used fuel and a collection receptacle in fluid communication with the source of used fuel. The collection receptacle includes a first flow opening for receiving fuel from the source of used fuel and a second opening for dispensing fuel therefrom. The universal fuel recycling assembly includes a reservoir for holding a quantity of the used fuel. The reservoir includes a water separating means. A first conduit in fluid communication with the source of the used fuel in the reservoir. A second conduit in fluid communication with the reservoir and the collection receptacle. The assembly includes at least two filtration devices configured to sequester at least a portion of contaminants contained in the used fuel, wherein a first filtration device is positioned upstream from a second filtration device. A third conduit is in fluid communication with the at least two filtration devices and with the second conduit. In addition, the assembly includes a routing valve having a first valve position and a second valve position. It is contemplated that the first position will be capable for drawing fuel from the reservoir through the second conduit and into the collection receptacle and the second position will be capable of directing fluid from the collection receptacle to at least one of the two filtration devices.

In one aspect of the device as disclosed herein, the universal fuel recycling assembly positions the first filtration device upstream from the reservoir and the collection receptacle, and the second filtration device is positioned downstream from the reservoir and collection receptacle.

In yet another aspect of the device as disclosed herein, the first and second filtration devices are both downstream from the reservoir and collection receptacle.

In another aspect, the first conduit, the reservoir, and a first portion of the second conduit are housed on a mobile unit configured to be transportable to remote sources of used fuel. A quick connect coupler connects the first portion of the second conduit with another portion of the second conduit to provide fluid communication between the reservoir and the collection receptacle.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The device as disclosed herein provides a quick and effective system for removing and recycling fuel from an associated fuel filter in the manner which renders little or no fuel spill while recycling fuel through the money saving universal recycling machine. The recycled fuel can be reused as desired or required. One such recycling option is to reintroduce the recycled fuel into the associated engine particularly into the fuel filter associated therewith. The device as disclosed herein is schematically depicted in the three Figures. The disclosed universal recycling machine permits safety to the environment and conservation of usable fuel.

Figure 1:
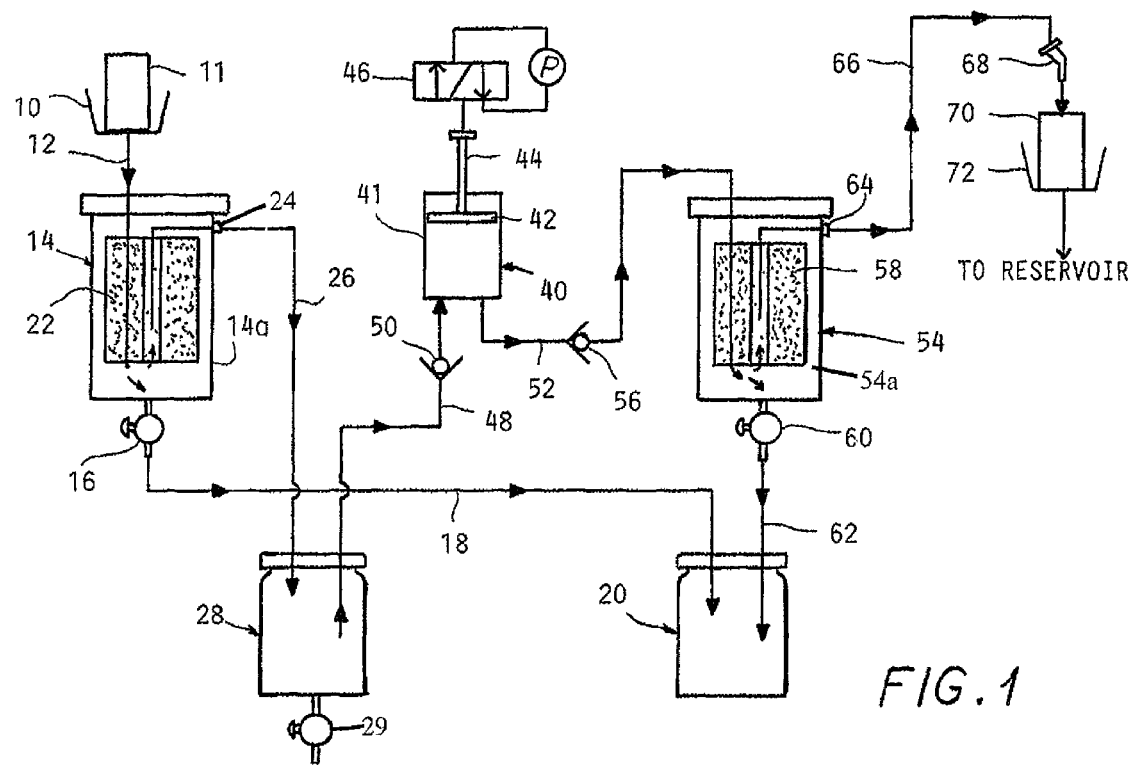
FIG. 1 is a schematic diagram of the money saving universal fuel recycling machine of the present invention according to the first embodiment.

In the first embodiment shown in FIG. 1, a first bracket 10 is provided for placement of an old fuel filter 11 or a source of old fuel for drainage through a conduit 12 and through a first filtration device 14. The first bracket 10 can be suitably configured to receive and retain the fuel filter removed from associate with the associated engine. The removed fuel filter will be retained in a manner. The fuel filter 11 can be of any suitable configuration. In certain embodiments, it is contemplated that the fuel filter 11 will be of a type employed with diesel engines in various types of larger trucks.

The bracket will typically be configured to permit the flow of fuel out of the filter 11. The first filtration unit can be configured to remove water or other contaminants entrained in the fuel. In the embodiment depicted in the drawing figures, as the old fuel passes through the first filtration unit 14, any water or other contaminants are separated from the fuel and fall via gravity to a lower section 14a of the first filtration unit 14. The first filtration unit 14 is constructed to have a filter medium 22 in an upper portion of the filtration unit 14 leaving a bottom portion for the collection of water and other contaminants.

A selectively opened drain such as a drainage pitcock 16 is provided at a lower end of the filtration unit 14 for selectively opening or connecting the first filtration unit 14 to conduit 18 in order to direct the water and other contaminants to the waste reservoir 20. Collected water and contaminant can be removed for further processing and disposal in a environmentally suitable manner as desired or required.

The fuel that passes through the filter medium 22 of the first filtration unit 14 flows out of the first filtration unit 14 such as through an exit port 24 to conduit 26 that leads to a collection reservoir 28. The reservoir 28 has a water separating means which includes another selectively opened drain or pitcock 29 leading to the waste reservoir 20. As an alternative, a suitable coupling member or spigot can replace the aforementioned pitcocks 16 and 29. In certain applications of the embodiment as depicted in FIG. 1, the reservoir 28 will have a volume suitable to receive the volume of fluid removed from the individual filter 11. The collection reservoir may have a suitable fixed volume. However, it is also considered within the purview of this disclosure that the collection reservoir include at least one movable wall that is moveable relative to an adjacent wall for varying an interior volume of the collection receptacle. Where desired or required, it is contemplated that the movable wall can vary relative to the position of the routing valve.

The assembly also includes suitable means for drawing fuel away from the used filter and/or conveying filtered fuel into the filter and/or other suitable engine-related location. In the embodiment depicted in the drawing figures, a piston actuated device 40 that comprises a cylindrical reservoir 41 and a movable piston 42 in fluid tight communication therein is incorporated in the assembly. The movable piston 42 is connected to a suitable arm 44 which can be used to move the piston 42 relative to the cylinder 41, increasing or decreasing the volume of the cylinder 41. When the piston 42 moves up and down, the arm 44 extends to a position exterior to the piston actuated device 40 and is suitably attached to a hydraulical or air operated pump P attached thereto. The pump P facilitates the movement of the fuel to and from the reservoir and filtration units.

A suitable routing valve 46 or other suitable directional means is used to direct the fuel out of the reservoir 28 and into the piston actuating device 40 or out of the piston actuating device 40 and into a fuel destination location such as a new fuel filter or recycled fuel container 70. When the routing valve 46 is in a first position, the routing valve 46 draws a quantity of fuel from the reservoir 28 through conduit 48 and into cylinder 41. In the embodiment as depicted herein the cylinder may be calibrated such that the quantity of fuel drawn into cylinder 41 may be calibrated to be essentially the quantity of fuel to fill the new fuel filter or recycled fuel container 70. A one way valve 50 prevents fluid fuel drawn into the cylinder 41 to flow back to the reservoir 28.

Once the fuel has been drawn out of the reservoir 28, the valve 46 can be reoriented into a second position and the piston 42 is depressed via pump P forcing the filtered fuel into the new or recycled fuel filter 70. A second one way valve 56 is disposed in conduit 52 to prevent fuel flow from the second filtration unit 54 back to the piston cylinder 41. The second filtration unit 54 can be configured to facilitate removal of additional contaminants from the fuel. In the embodiment depicted, it is contemplated that the second filtration unit 54 contains suitable filtration medium 58 capable of removing contaminants from the fuel. The second filtration unit 54 may be constructed similarly to the first filtration unit 14, wherein the filtration medium 58 is located in an upper portion leaving a lower space 54a for the collection of water and contaminants to be drained into the waste container 20. The second filtration unit 54 will also include means for removing the sediment or aqueous material from the fuel. A non-limiting example of suitable sediment and/or water removing means includes a water separation device such as a drainage pitcock 60 or a suitable coupling member located in the lower end of the second filtration unit 54. The pitcock 60 is selectively opened for directing the aqueous mixture of water and other contaminants through conduit 62 to the waste receptacle 20.

The filtration media 22 employed in the associated first and/or second filtration units 14 and 54 may be of a type that is removable from the associated filtration unit on a periodic basis and replaceable when the media becomes saturated or unable to provide suitable filtration function. Alternately, it is considered within the purview of this disclosure that the entire filtration units with filtration media contained therein will be removable from the universal fuel recycling machine device to permit replacement with fresh filtration unit(s) as desired or required. Thus the filtration units will include suitable joints and/or access points to facilitate filtration media remove and/or removal and replacement of the filter unit relative to the assembly as desired or required.

Generally, the associated filtration units 14, 54 will have an interior volume sufficient to contain an amount of filtration media sufficient to achieve the desired level of fuel filtration and/or purification. It is anticipated that the filtration media will remain active through multiple iterations of fuel purification and/or filtration. Generally, the volume of each of the associated filtration units 14, 54 will be one which will permit the efficient and rapid filtration of the fuel passing through the filtration media oval from the used fuel filter and/or upon discharge from the receptacle 28 depending upon the location along the fuel treatment circuit.

In the embodiment depicted in FIG. 1, the filtered, clean recycled fuel exits the second filtration unit 54 via port 64. Through conduit 66 and via a nozzle 68 at the end of conduit 66, regenerated fuel can be dispensed into the new fuel filter or a suitable container for recycled fuel 70. In the embodiment depicted in FIG. 1, the new fuel filter or recycled fuel container 70 is held within a suitably configured bracket 72 while being charged with the filtered recycled fuel. The bracket 72 is configured such that any potential overflow or spillage of fuel as it is transferred into the new fuel filter 70 can be directed back to the reservoir 28 through a suitable conduit 74.

Figure 2:
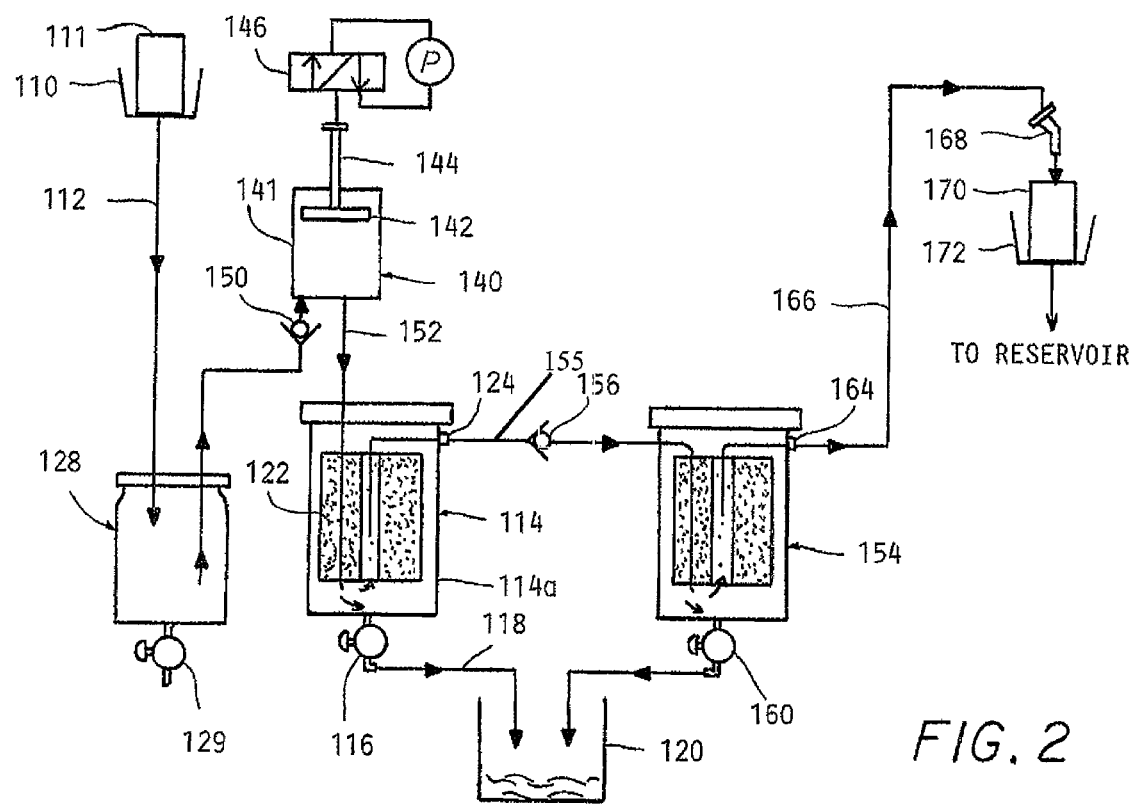
FIG. 2 is a schematic diagram of the money saving universal fuel recycling machine of the present invention according to the second embodiment.

A second embodiment is shown in FIG. 2. In this second embodiment, an old fuel filter or other source of used fuel 111 is placed in a suitably configured bracket 110 so that the spent fuel can drain through conduit 112 and into a reservoir 128. The reservoir 128 as depicted in FIG. 2 has the capacity to hold the fuel from a multiple number of fuel filters.

The reservoir 128 can also include water separating means. One non-limiting example of water separating means includes a pitcock 129 that communicates with a suitable waste water collection vessel or other suitable waste water receiving means where the waste water can be held for treatment and/or suitable disposal in a safe and environmentally friendly manner. In the embodiment depicted in FIG. 2, the pitcock 129 leads to a conduit directed to a waste reservoir (not shown). The pitcock 129 or other similar device offers selectable drainage of the water from the reservoir 128.

Downstream from the reservoir 128 is a piston actuated device 140 similar to that as described with regard to FIG. 1. The piston actuated device 140 includes a cylindrical reservoir 141 and a movable piston 142. The movable piston is connected to a suitable arm 144 which can be used to move the piston 142 within the cylinder 141, increasing or decreasing the volume in the cylinder 141 as the piston 142 moves up and down. The arm 144 extends to a position exterior to the piston activated device 140 and is suitably attached to a hydraulic or air operated pump P attached thereto. A suitable directional valve 146 similar to that disclosed in FIG. 1 at 46 is oriented to allow the pump P to draw a quantity of fluid from the reservoir 128 into the piston actuated device 140 or to draw fluid from the piston actuated device 140 for filling a new filter with recycled fuel into container 170. The quantity of fuel drawn into cylinder 141 may be calibrated to be essentially the quantity of fuel to fill the new fuel filter with recycled fuel container.

When it is desired to fill a new filter with the recycled fuel into container 170, the directional valve 146 is orientated so that the pump P moves the piston 142 in a downward direction. Also, when it is desired or required to draw contaminated fuel from reservoir 128, pump P can move piston 144 upward to fill cylinder 141 with contaminated fuel. A one way valve 150 prevents fuel drawn into the cylinder 141 from flowing back to the reservoir 128. The first filtration unit 114 can be configured similar to the first filtration unit 14 as discussed with regard to FIG. 1.

The first filtration unit 114 is constructed to have a filter medium 122 in an upper portion leaving space at the bottom 114a of the unit 114 for water and contaminants to collect. The fuel flows through the first filtration unit 114 and its associated filter medium 122 so that contaminants and aqueous debris either are trapped in the filter medium 122 or settle at the lower portion 114a of the first filtration unit 114. Contaminants and other aqueous debris can be removed from the first filtration unit 114 through a pitcock 116 or suitable spigot or coupling member located at a lower end of the filtration unit 114. The pitcock 116 can be selectively opened for removal of the contaminants from the filtration unit 114 and allow the contaminants to flow through conduit 118 to the waste receptacle 120.

The filtered fuel leaves the first filtration 114 through port 124. Before being dispensing into a new or recycled fuel container or fuel filter 170, it is desirable for the fuel to undergo a second filtration process to ensure that the fuel is thoroughly recycled. Therefore a second filtration unit 154 is placed in series adjacent the first filtration unit 114. Between the first and second filtration units 114, 154 respectively, a second one way valve 156 may be positioned to prevent fuel from returning to the first filtration unit 114.

The second filtration unit 154 may be of similar construction to the second filtration unit 54 as discussed with regard to FIG. 1 in that a filter medium can be located in an upper portion of the unit 154 leaving space at the bottom 154a of the unit 154 for water and contaminants to collect. Any contaminants that bypass the first filtration unit 114 can be removed from the fuel in the second filtration unit 154 and sent to the waste receptacle 120 through pitcock 160 and conduit 162. Where desired to required, the filtration media and configuration of the second filtration unit 154 can be configured to complement the first unit. Where desired or required, the second filtration unit 154 can be configured to further purify the fuel material passing therethrough by employing a complementary but different filtration media, etc.

It is also contemplated that the assembly can include suitable stations to replenish any trace components lacking in the filtered fuel, components diminished either by routine usage of the fuel or by the filtration process itself. Such stations may be integrated into the second filtration unit or present downstream thereof (not shown). It is also within the purview of this disclosure that these stations may configured to insert or provide suitable additives having salutary effects on characteristics including but not limited to general engine wear, engine performance, performance characteristics of the replaced filter and the like.

The replenished fuel exits the second filtration unit 154 under the power of the pump P through port 164 to conduit 166 for filling a new filter with a recycled fuel container 170 through a nozzle 168. The new fuel filter 170 sits on a bracket 172. Any overflow of fuel to the new filter or recycled fuel container 170 is directed back to the reservoir 128 through a conduit 174.

Figure 3:
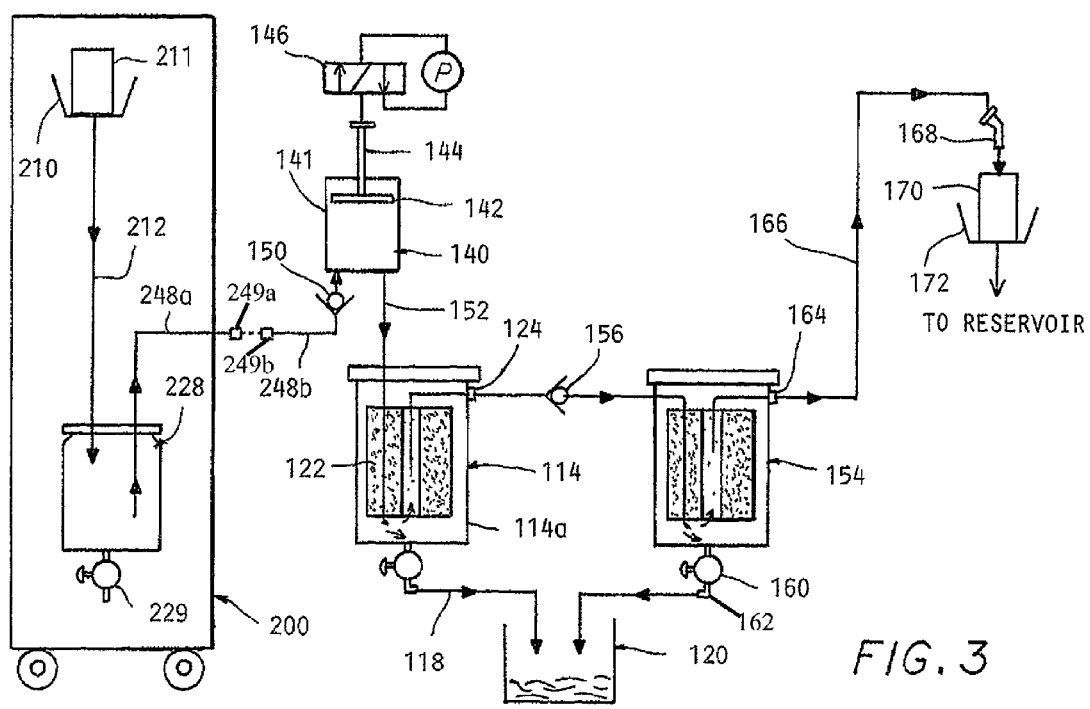
FIG. 3 is a schematic diagram of the money saving universal fuel recycling machine of the present invention according to the third embodiment.

It is contemplated that the assembly disclosed herein can be stationarily mounted or can be transportable from site to site. Where the assembly is transportable, it is contemplated that the transportable or mobile housing can contain some or all of the elements discussed previously. One non-limiting example of a mobile configuration is depicted in FIG. 3. The embodiment shown in FIG. 3 includes many of the same elements as the embodiment shown in FIG. 2. However, a portion of the system contained on a mobile unit 200 for easy transport to the site of the old fuel filter or receptacle containing old fuel 211. In particular, the transportable unit 200 includes the bracket 210 for holding an old fuel filter or receptacle containing old fuel 211 and a reservoir 228. The fuel from the old fuel filter 211 drains through conduit 212 to the reservoir 228. The transportable unit 200 can be moved to various sites to purge old filters 211 and store the spent fuel in the reservoir 228. The reservoir 228 has a capacity for holding a quantity of fuel from multiple sources. The reservoir 228 has a water separating means which includes a drainage pitcock 229 for hook up to a waste receptacle 120. Once a quantity of spent fuel is stored in the reservoir 228, output conduit 248a from the reservoir 228 can be selectively connected to an input conduit 248b of the filtration process unit 300. The output and input conduits 248a, 248b, respectively, can be connected by a conventional quick disconnect device 249a, 249b. It is understood that the quick disconnect device 249a, 249b has an access port that is sealed when the mating members are not connected.

The filtration process unit 300 is essentially the same unit as discussed in FIG. 2 and therefore similar components maintain the same reference number. The filtration process unit 300 includes the directional valve 146 which controls the piston actuating device 140, preferably two filtration units 114 and 154, a waste reservoir 120 and the nozzle 168, and associated conduits and brackets for filling a new fuel filter or recycled fuel container 170. Where desired or required, the waste reservoir 120 can be located external to the filtration process unit 300. It is also considered to be within the purview of this disclosure to house the waste receptacle 120 within the confines of any housing associated with the filtration process unit 300 as illustrated in FIG. 3.

After a quantity of old fuel has been stored in the reservoir 228, the mobile unit 200 can be connected to the filtration process unit 300 for processing of the stored fuel. The pitcock 229 can be selectively connected to a conduit (not shown) leading to the waste receptacle 120 of the filtration process unit 300. Water contaminants can then be purged from the reservoir 228 before processing and filtering of the fuel material such as diesel fuel. The pitcock 229 is closed when the water contaminants have been evacuated from the reservoir 228.

The reservoir 228 can be placed in fluid connection to the filtration process unit 300 by a suitable connection device such as the quick disconnect device 249a, 249b. Once the conduits 248a, 248b are fluidly connected, the filtration process unit 300 can be activated. The directional valve 146 is orientated so that the pump P moves the piston 142 in an upward direction to draw out a quantity of fuel from the reservoir 228. The quantity of fuel drawn out may be calibrated for preconditioning a new or recycled fuel filter device 170 or transfer to any other suitable container. The fuel flows from the reservoir 228 through conduits 248a, 248b into the piston activated device 140. The valve 146 can then be reoriented into a second position causing the pump P to depress the arm 144 to move the piston 142 downward, forcing the fuel through conduit 152 into the first filtration unit 114. A one way valve 150 prevents fuel drawn into the cylinder 141 to flow back to the reservoir 128.

The fuel flows through the first filtration unit 114 and its associated filter medium 122 so that contaminants and aqueous debris can be removed from the first filtration unit 114 by a suitable mechanism such as through a pitcock 116 or suitable spigot or coupling located at a lower end of the filtration 114. The pitcock 116 can be selectively opened for removal of the contaminants from the filtration unit 114 and allow the contaminants to flow through conduit 118 to the waste receptacle 120. The filtered fuel leaves the first filtration 114 through port 124 and through conduit 155 to the second filtration unit 154. Any contaminants that bypass the first 114 can be removed from the fuel in the second filtration unit 154 and sent to the waste receptacle 120 through pitcock 160 and conduit 162.

The filtered and/or replenished fuel exits the second filtration unit 154 under the power of pump P, through port 164 to conduit 166 for filling a new or recycled fuel to container 170 through nozzle 168. Any overflow of fuel to the new or recycled fuel container 170 can be routed through conduit 174 to the reservoir 228 on the mobile unit 200.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A universal fuel recycling assembly comprising:
   means for establishing fluid communication with a source of used fuel;
   a reservoir for holding a quantity of used fuel, said reservoir having a water separating means;
   a first conduit in fluid communication with the source of used fuel and the with reservoir;
   a second conduit in fluid communication with the reservoir and with the collection receptacle;
   at least one first filtration device, the filtration device having at least one sequestration element capable of sequestering at least a portion of contaminants contained in the used fuel, wherein the at least one first filtration device is upstream from the reservoir;
   a pressure generating device positioned downstream relative to the first conduit and the at least one first filtration device, the pressure generating device positioned to exert negative pressure on the at least one filtration device and the first conduit
   a third conduit in fluid communication with pressure generating device downstream of the second conduit, wherein the pressure generating device is positioned to establish positive pressure on the third conduit; and
   a routing valve, the routing valve having a first position for drawing fuel from the reservoir through the second conduit, and having a second position for directing fuel into the third conduit, wherein the third conduit is configured to be in releasable fluid communication with at least one fuel reservoir external to the assembly.

2. The universal fuel recycling assembly of claim 1 wherein the source of used fuel is an engine fuel filter configured to be removably detachable from an associated engine.

3. The universal fuel recycling assembly of claim 1, further comprising a collection receptacle associated with the pressure generating means, wherein the at least one first filtration device is positioned upstream from the reservoir and collection receptacle.

4. The universal fuel recycling assembly of claim 3, further comprising at least one second filtration device is positioned downstream from the reservoir and collection receptacle.

5. The universal fuel recycling assembly of claim 3, wherein the first filtration device has a water separating means, wherein the water separating means selectively and fluidly communicates with a waste receptacle, the waste receptacle configured for removal of water and contaminants collected in the first filtration device.

6. The universal fuel recycling assembly of claim 5 further comprising a housing, wherein the filtration units, device and pump are located within the housing.

7. The universal fuel recycling assembly of claim 4, further comprising a selectively opened drain in the reservoir and in each of the first and second filtration devices, said drains in fluid communication with the interior of the reservoir and each of the first and second filtration devices respectively for drawing water therefrom, and means for selectively opening and closing the respective drains.

8. The universal fuel recycling assembly of claim 1, further comprising means for dispensing fuel from the third conduit into new fuel container.

9. The universal recycling assembly of claim 8, further comprising means for directing an overflow of fuel to one of the new fuel container to the reservoir.

10. A universal fuel recycling assembly comprising:
    means for establishing fluid communication with a source of used fuel;
    a collection receptacle including a first flow opening for receiving fuel from the source of used fuel;
    a reservoir for quantity of used fuel, said reservoir having a water separating means, wherein the collection receptacle is downstream from the reservoir;
    a first conduit in fluid communication with the source of used fuel and the with reservoir;
    a second conduit in fluid commendation with the reservoir and with the collection receptacle;
    at least two filtration devices, the filtration devices capable of sequestering at least a portion of contaminants contained in the used fuel, wherein a first filtration device is upstream from a second filtration device and wherein the first filtration device is positioned upstream from the reservoir and collection receptacle and the second filtration device is positioned downstream from the reservoir and collection receptacle;
    a third conduit in fluid communication with the at least two filtration devices and the second conduit:
    a routing valve, the routing valve having a first position for drawing fuel from the reservoir through the second conduit and into the collection receptacle, and having a second position for directing fuel from the collection receptacle to at least one of the at least two filtration devices and
    a housing, wherein the filtration units, pump and waste receptacle are located within the housing.

11. The universal fuel recycling assembly of claims 10, wherein the first and second filtration devices are positioned downstream from the reservoir and collection receptacle.

12. The universal fuel recycling assembly of claim 11, wherein said first and second filtration devices each have a water separating means disposed at a lower portion of each device, wherein each water separating means selectively fluidly communicates with a waste receptacle for removal of water and contaminants stored in the first and second filtration devices.

13. A universal fuel recycling assembly comprising:
  means for establishing fluid communication with a source of used fuel;
  a collection receptacle including a first flow opening for receiving fuel from the source of used fuel, wherein the collection receptacle has a movable wall relative to an adjacent wall for varying an interior volume of the collection receptacle;
  a reservoir for holding a quantity of used fuel, said reservoir having a water separating means, wherein the collection receptacle is downstream from the reservoir;
  a first conduit in fluid communication with the source of used fuel and the with reservoir;
  a second conduit in fluid commendation with the reservoir and with the collection receptacle;
  at least two filtration devices, the filtration devices capable of sequestering at least a portion of contaminants contained in the used fuel, wherein a first filtration device is upstream from a second filtration device;
  a third conduit in fluid communication with the at least two filtration devices and the second conduit; and
  a routing valve, the routing valve having a first position for drawing fuel from the reservoir through the second conduit and into the collection receptacle, and having a second position for directing fuel from the collection receptacle to at least one of the at least two filtration devices.

14. The universal fuel recycling assembly of claim 13, wherein the movable wall moves relative to the position of routing valve.

15. The universal fuel recycling assembly of claim 14, further comprising a drain in the first and second filtration devices and means for selectively opening and closing the respective drains for draining water therefrom.

16. The universal fuel recycling assembly of claim 13, wherein the collection receptacle has a movable wall relative to an adjacent wall for varying an interior volume of the collection receptacle relative to the position of the routing valve.

17. The universal fuel recycling assembly of claim 13, wherein the first conduit, the reservoir, and a first portion of the second conduit are housed on a mobile unit transportable to a remote source of used fuel.

18. The universal fuel recycling assembly of claim 17, further comprising a quick connect couple having a first coupling fluidly secured to the first portion of the second conduit and second mating coupler connected to a second portion of the second conduit, said reservoir in fluid communication with the collection receptacle when the quick connect coupler is engaged.

* * * * *